Oct. 13, 1931. A. J. FIUMEDORO Re. 18,224

NECKTIE

Original Filed Aug. 6, 1928

Inventor

A. J. Fiumedoro,

By Stone, Boyden, Mack & Hahn,

Attorneys.

Reissued Oct. 13, 1931

Re. 18,224

UNITED STATES PATENT OFFICE

ALOYSIUS JOHN FIUMEDORO, OF READVILLE, MASSACHUSETTS, ASSIGNOR TO STANDARD NECKWEAR CO., OF BOSTON, MASSACHUSETTS, AND NEW YORK, N. Y., A CORPORATION

NECKTIE

Original No. 1,728,599, dated September 17, 1929, Serial No. 297,752, filed August 6, 1928. Application for reissue filed June 3, 1931. Serial No. 541,931.

The present invention relates to neckties of the four in hand type and has for its principal object to provide a permanent tie of this character which may be instantly arranged in position about the neck of the wearer without necessitating the tying of the tie each time the tie is worn.

A further object of the invention is to provide a tie of this character in which the knot forming part of the tie is tied by hand in the usual manner and the parts sewed or otherwise permanently secured together and with the portion of the tie disposed adjacent the knot constructed of a tubular formation through which an elastic band may be inserted for adjustably securing the tie in position upon the wearer.

A further object of the invention is to provide an article of this character which closely simulates the usual hand tie so as to embody the attractive appearance thereof and in which the parts are secured in a fixed position with respect to each other so as to prevent slipping of the parts while being worn, which provides for economy in the amount of material used in constructing the tie and otherwise well adapted for the purposes for which the same is intended.

Other objects and advantages reside in the special construction, combination and arrangement of the various elements forming the invention as more fully hereinafter described and claimed, reference being had to the accompanying drawings wherein like numerals refer to like parts throughout, and in which:

Figure 1:
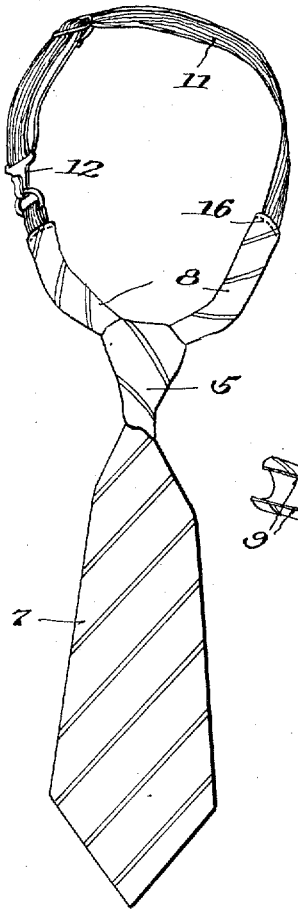
Figure 1 is a perspective view looking toward the front of the tie.
Figure 2:
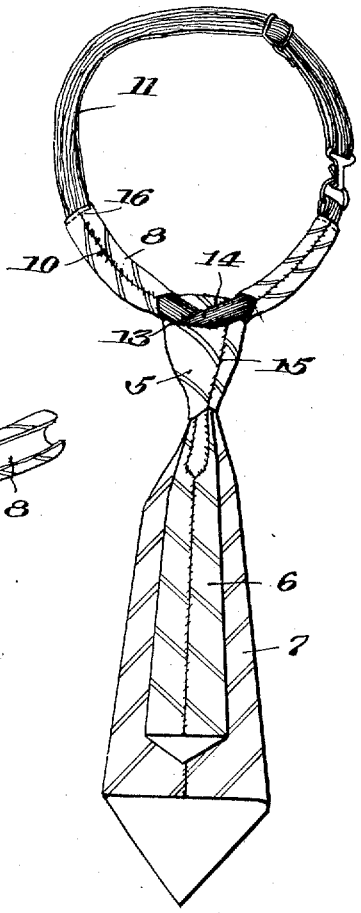
Figure 2 is a similar view looking toward the rear thereof.
Figure 4:
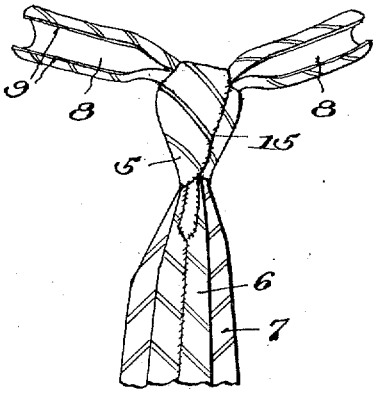
Figure 3:
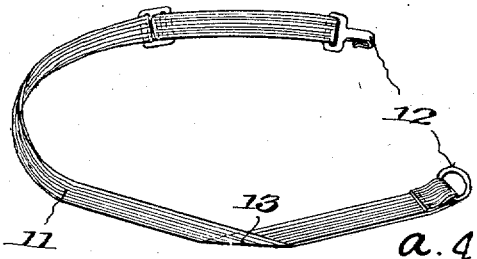
Figure 3 is a similar view of the elastic band provided for securing the tie around the neck of the wearer, and, Figure 4 is a rear perspective view of the knotted portion of the tie and illustrating the tubular formation of the ends thereof for receiving the elastic band.

Referring to the drawings in detail, for the purpose of illustration I have disclosed a preferred embodiment of my invention, which comprises a necktie of the four in hand type and which includes the tying of the material to form the usual knot 5 intermediate the ends thereof, said knot being tied by hand, as is customary when the same is usually arranged about the neck of the wearer.

The portion of the tie which usually extends about the neck of the wearer from the knotted portion 5 is separated so that the tie in reality is constructed of a pair of sections of material indicated at 6 and 7 and corresponding respectively to the inwardly and outwardly disposed portions of the conventional tie.

Portions 8 of the sections 6 and 7 project from the knot and extend partially about the neck of the wearer in opposite directions from the knotted portion 5 and have their opposite side edges 9 brought together and secured by sewing as indicated at 10 for the purpose of forming such ends of the material tubular.

The portions of the ends of the material 8, adjacent the knotted portion 5 are left open so that the tubular formation of one of the ends 8 will have communication behind the knot with the tubular formation of the other of said ends. An elastic band 11 is inserted through the tubular portions of the tie, the ends of the elastic band being provided with a suitable catch designated at 12 for securing the elastic band about the neck of the wearer.

The portion of the elastic band disposed behind the knotted portion 5 of the tie is twisted as shown at 13 so that the elastic material will be turned at an angle corresponding to the angle formed between the knotted portion 5 and the opposite ends 8 of the tie.

The elastic band 11 is sewed to the adjacent portions of the ends 8 and knotted portion 5 as shown at 14 and the overlapping portions of the material forming the knot 5 are also sewed together as at 15 at a position at the rear of the knot.

The ends of the tubular portions 8 of the tie are also sewed to the elastic band as shown at 16 to prevent the slipping of the elastic band therein or the wrinkling of the material.

It will be apparent from the foregoing that the tie constructed in accordance with my invention will have the appearance of the usual four in hand tie and at the same time will have its knotted portion secured in a fixed position to prevent the displacement thereof while being worn.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. A necktie comprising a knot, tubular end portions extending from said knot, and an elastic supporting band, passing through said tubular end portions and secured to said knot.

2. A necktie comprising a knot, tubular end portions extending from said knot, an elastic supporting band passing through said tubular end portions and twisted at a point adjacent to said knot, said twisted portion being secured to said knot.

3. A necktie comprising a knot, and a flat elastic supporting band twisted at a point adjacent to said knot, said twisted portion being secured to the rear side of said knot.

4. A necktie comprising a knot, end portions extending therefrom at an angle to each other, an elastic supporting band twisted at a point adjacent said knot and secured thereto, the angle formed by the portions of said band extending from said twist being substantially the same as the normal angle formed by the end portions.

5. A necktie comprising a pair of sections of material tied together intermediate their ends to form a knot, two of the ends of said material extending laterally from said knot in opposite directions and being formed tubular, and an elastic band, passing through said tubular ends and secured to said knot.

6. A necktie comprising a pair of sections of material tied together intermediate their ends to form a knot, and an elastic supporting band having a twisted portion adjacent and secured to said knot.

7. A necktie constructed of a pair of sections of material and formed with a knotted portion intermediate their ends, said end portions each having their side edges secured together to form said ends tubular with the tubular portion of each end having an opening to permit communication with the other end behind said knotted portion and an elastic band inserted through said tubular ends and the openings therein behind the knotted portion and adapted for securing the tie about the neck of the wearer.

In testimony whereof I affix my signature.

ALOYSIUS JOHN FIUMEDORO.